April 14, 1964

JULES-FLORENT-JOSEPH BOURGUIGNON 3,129,371

DEVICE FOR CONVERTING LIGHT ENERGY INTO MECHANICAL ENERGY

Filed Jan. 30, 1961

2 Sheets-Sheet 1

INVENTOR
Jules-Florent-Joseph Bourguignon
BY
ATTORNEYS

United States Patent Office 3,129,371
Patented Apr. 14, 1964

3,129,371
DEVICE FOR CONVERTING LIGHT ENERGY
INTO MECHANICAL ENERGY
Jules-Florent-Joseph Bourguignon, Seilles, Belgium,
assignor to Baumgartner Frères S.A., Grenchen,
Switzerland
Filed Jan. 30, 1961, Ser. No. 85,818
Claims priority, application Switzerland June 9, 1960
8 Claims. (Cl. 318—480)

The present invention relates to a device for converting light energy into mechanical energy, comprising at least one photo-electric cell.

Feeding an electric motor with the current furnished by a photo-electric cell is well-known to those skilled in the art. For the present invention photo-electric cell means a photovoltaic cell or, in general, a photo-electric cell or cells producing a current or a potential only when they are illuminated and the electromotive force of which is proportional to the quantity of light received. If the light received by the cell is of sufficient intensity, direct connection of the terminals of the cell with the terminals of the motor is possible for continuous rotation of the electric motor so that the motor may be used for various purposes such as, for instance, for winding up watch movements or for automatically adjusting a movable set in order to allow adjusting the position of another photoelectric cell or cells feeding a watch movement so that said other cell or cells may receive a maximum amount of light.

If, however, the quantity of light falling onto the photoelectric cell or cells is small, the motor cannot be driven. On using more and more sensitive motors the threshold or limit of the quantity of light above which the motor runs may be lowered, but below the said threshold the motor no longer rotates even if the cell is further exposed to the light.

The invention remedies the above mentioned inconvenience by having even the weakest light assist in driving the motor. The device according to the invention is characterised by at least one condenser connected to the photoelectric cell and by an automatic regulator for connecting the condenser, for the purpose of driving the motor, to the electric motor on the condenser being charged.

The drawings schematically illustrate, by way of examples, five embodiments of the invention.

Figure 1:
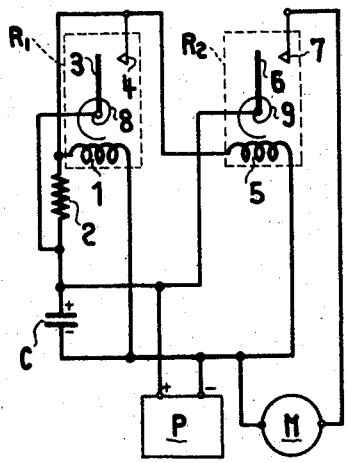
Figure 2:
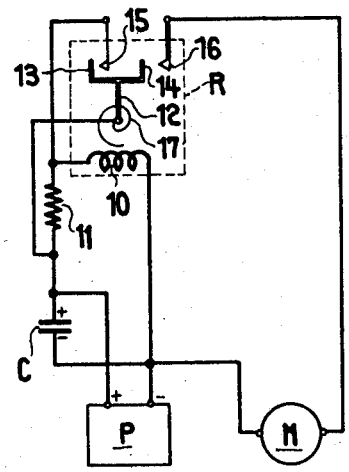
Figure 3:
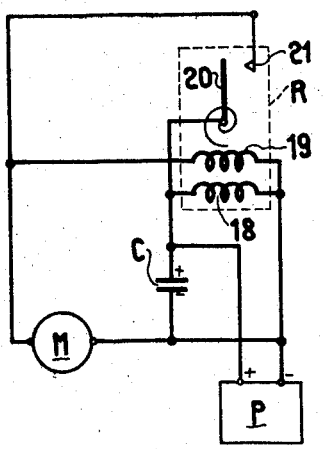
Figure 4:
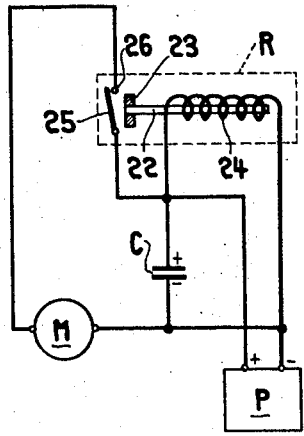
Figure 5:
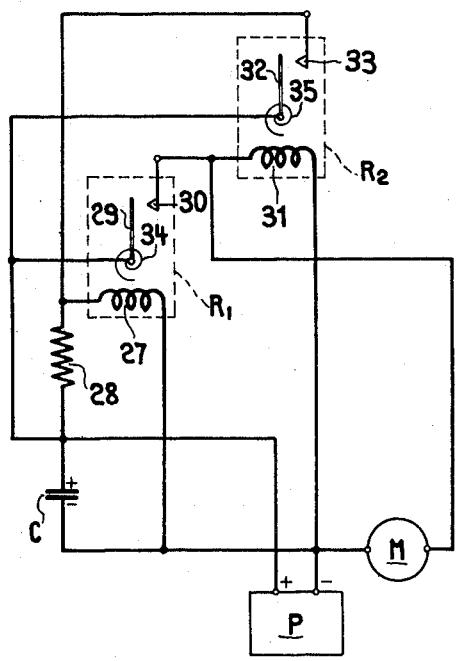

FIG. 1 is a circuit diagram of a first embodiment of the invention which employs two single-contact relays connected in parallel to the condenser, FIG. 2 is a circuit diagram of a second embodiment of the invention which employs one double-contact relay connected to the condenser, FIG. 3 is a circuit diagram of a third embodiment of the invention which employs a relay comprising a high-ohmic winding continuously connected to the charging condenser and a low-ohmic winding intermittently connectable to the condenser, FIG. 4 is a circuit diagram of a fourth embodiment of the invention which employs a relay with delayed operation connected to the condenser, and FIG. 5 is a circuit diagram of a fifth embodiment of the invention which employs two relays connected in cascade to the condenser, whereby the one relay is continuously connected to the condenser whereas the other relay is intermittently connected to the condenser by the said one relay.

In the first example (FIG. 1) a photoelectric cell P is connected to the terminals of a condenser C. The device also comprises two relays $R_1$ and $R_2$ and an electric motor M, these means being connected as follows: The winding 1 of the relay $R_1$ is in connection with the terminals of the condenser C through the intermediary of a resistance 2. The positive pole of the condenser C is also connected to the armature or movable contact 3 of the relay $R_1$, while the fixed contact 4 of the relay $R_1$ is connected to a point lying between the winding 1 and the resistance 2. The fixed contact 4 is also connected to the winding 5 of the relay $R_2$, the other end of which goes to the negative pole of the condenser C. The armature or movable contact 6 of the relay $R_2$ is connected to the positive pole of the condenser C, while the fixed contact 7 of the relay $R_2$ is connected to a terminal of the electric motor M, the other terminal of which is connected to the negative pole of the condenser C. Schematically illustrated spiral springs 8 and 9 guarantee the return of their respective armatures 3 and 6.

The device according to FIG. 1 works as follows:

Be it assumed that a weak light, e.g. of an intensity of 50 lux, falls onto the photoelectric cell P. The current produced by the cell P is insufficient for driving the motor M even if the latter were very sensitive. However, this current is sufficient for charging the condenser C. As long as the condenser C is not charged, the armatures 3 and 6 occupy the position shown in FIG. 1, but when the condenser C begins to be charged, the circuit 1, 2 receives current so that the armature 3 is slowly displaced towards the fixed contact 4. At the same time, also the winding 5 of the relay $R_2$ receives current and the armature 6 is slowly displaced towards the fixed contact 7; but the relays $R_1$ and $R_2$ are constructed in such a way that the contact pair 6, 7 of the relay $R_2$ is always closed after the contact pair 3, 4 of the relay $R_1$. This condition may for instance be obtained by choosing the spring 9 stronger than the spring 8 or by the provision that, in the state of repose of the relays, the distance between the contacts 6 and 7 is greater than the distance between the contacts 3 and 4. The resistances of the circuit 1, 2 are calculated in such a way that the armature 3 touches the fixed contact 4 at the moment when the condenser C is completely charged. At that moment, the following circuit holds the contact pair 3, 4 closed: positive pole of the condenser C, armature 3, fixed contact 4, winding 1, negative pole of the condenser C. Moreover, another circuit is established sending a strong current into the winding 5 of the relay $R_2$: positive pole of the condenser C, armature 3, fixed contact 4, winding 5, negative pole of the condenser C. As may be seen, the resistance 2 is short-circuited in these two parallel circuits so that the current flowing through the windings 1 and 5 is much greater than in the initial phase when the condenser C was not yet completely charged. As a consequence, the armature 3 remains strongly adhered to the fixed contact 4 of the relay $R_1$, while the armature 6, which already arrived in the vicinity of the fixed contact 7, is suddenly thrown against the fixed contact 7 of the relay $R_2$. At this moment, the circuit of the motor M is established as follows: positive pole of the condenser C, armature 6, fixed contact 7, motor M, negative pole of the condenser C. This circuit has no other resistance than that of the motor M and, therefore, the latter is started to rotate as long as permitted by the condenser C that is, practically until the condenser C is discharged. As is well-known, starting the motor M requires more energy than maintaining its rotation. However, at the moment when the motor M is to be started, the condenser C is just charged to the maximum so that it has sufficient force to easily start the motor M. Some time later, the partially discharged condenser C has still energy enough for maintaining the rotation of the motor M. When the condenser C is discharged, the motor M stops, and another cycle can begin. Therefore, the motor M is intermittently driven if the quantity of light falling onto the cell P is relatively small. However, the device described with reference to FIG. 1 enables the motor M to turn continuously and not intermittently if the light arriving on the cell P is of sufficient intensity. In this case, the condenser C is indeed permanently charged to the maximum so that the pairs of contact 3, 4 and 6, 7 remain permanently closed.

The second example (FIG. 2) differs from the first one in that the two relays $R_1$ and $R_2$ are replaced by a single relay R with two contacts. The photo-electric cell P is connected to the terminals of the condenser C and the winding 10 of the relay R is in connection with the terminals of the condenser C through the intermediary of a resistance 11. The positive pole of the condenser C is also connected to the armature 12 of the relay R. This armature 12 is in the shape of a fork the branches 13 and 14 of which are to cooperate with the fixed contacts 15 and 16 respectively. In the state of repose, as shown in FIG. 2, the distance between the branch or contact 13 and the contact 15 is smaller than the distance between the branch or contact 14 and the contact 16. Moreover, the so-called fixed contact 15 is mounted on an elastic tongue yielding under the action of the contact 13. The contact 15 is in connection with a point lying between the winding 10 and the resistance 11 while the contact 16 is connected to a terminal of the electric motor M, the other terminal of which is connected to the negative pole of the condenser C. A schematically illustrated spiral spring 17 guarantees the return of the armature 12.

The device described with reference to FIG. 2 works as follows: when the cell P is illuminated the current produced gradually charges the condenser C and the circuit 10, 11 receives current so that the armature 12 is slowly displaced in the clockwise direction of FIG. 2. The resistances are calculated in such a way that the contact 13 of the armature 12 touches the contact 15 at the moment when the condenser C is completely charged. At this moment, the following circuit holds the contact pair 13, 15 closed: positive pole of the condenser C, armature 12, contact 13, contact 15, winding 10, negative pole of the condenser C. As may be seen, the resistance 11 is short-circuited in this circuit so that the current flowing through the winding 10 is much greater than before the closing of the contact pair 13, 15. In consequence, the armature 12 is now suddenly displaced in the clockwise direction of FIG. 2, the contact 13 makes the contact 15 elastically yield and the contact 14 strikes against the rigid fixed contact 16. At this moment, the two contact pairs 13, 15 and 14, 16 are simultaneously closed. The circuit of the motor M is then closed as follows: positive pole of the condenser C, armature 12, contact 14, contact 16, motor M, negative pole of the condenser C. This circuit comprises no other resistance than that of the motor M and the latter begins to turn and rotates as long as is permitted by the condenser C. When the condenser C is discharged, the motor M stops and another cycle can begin. Therefore, the motor M is intermittently driven if the quantity of light falling onto the cell P is relatively small. As in the first example, the motor M can, however, continuously rotate if the light illuminating the photo-electric cell P has an intensity sufficient to maintain the condenser C charged to the maximum.

In the third example (FIG. 3) the relay R is of particular construction and comprises two windings 18 and 19 acting on a common armature 20. The winding 18 has a great and the winding 19 a small resistance. The photoelectric cell P connected to the terminals of the condenser C and the winding 18 of the relay R is in connection with the terminals of the condenser C without the insertion of any resistance. The positive pole of the condenser C is also connected to the armature 20 of the relay R, while the fixed contact 21 of the relay R is, on the one part, connected to the winding 19 the other end of which goes to the negative pole of the condenser C, and on the other part, to one of the terminals of the motor M, the other terminal of which is connected to the negative pole of the condenser C.

When the photo-electric cell P is illuminated the current produced charges the condenser C and the winding 18 with greater resistance is traversed by the current so that the armature 20 is displaced in the clockwise direction of FIG. 3. The resistance of the winding 18 is chosen in such a way that the armature 20 touches the fixed contact 21 at the moment when the condenser C is completely charged. At this moment the following circuit holds the contact pair 20, 21 closed: positive pole of the condenser C, armature 20, fixed contact 21, winding 19, negative pole of the condenser C. Since the winding 19 has a smaller resistance than the winding 18, the retaining current of the relay R is greater than before the closing of the contact pair 20, 21. In consequence, the armature 20 remains strongly adhered to the fixed contact 21. The circuit of the motor M is at the same time established as follows: positive pole of the condenser C, armature 20, fixed contact 21, motor M, negative pole of the condenser C. This circuit comprises no other resistance than that of the motor M and the latter starts and rotates until the condenser C is discharged. Another cycle can now begin.

As in the preceding examples the motor M is also in this third embodiment driven intermittently or continuously according to whether the light falling onto the photo-electric cell P has an intensity insufficient or sufficient for maintaining the condenser C permanently charged to the maximum.

The fourth example (FIG. 4) comprises a time-delay relay R, that is, a relay with delayed attraction and delayed release. Such a relay of known construction comprises a core 22 to one end of which a copper ring 23 is fixed. The photo-electric cell P and the winding 24 of the relay R are connected to the terminals of the condenser C. The postive pole of the condenser C is furthermore connected to the armature 25 of the relay R, while the fixed contact 26 of the latter is in connection with one of the terminals of the motor M, the other terminal of which is connected to the negative pole of the condenser C. A spring (not shown) guarantees the return of the armature 25.

The current produced by the photo-electric cell P charges the condenser C and the winding 24 of the relay R is traversed by the current. Because of the presence of the copper ring 23 the attraction of the armature 25 is delayed for a certain time. However, the condenser C is charged more and more and the moment arrives when the copper ring 23 is saturated and can no longer prevent the aramature 25 from being attracted. Therefore, the armature is displaced and strikes against the fixed contact 26, closing in this way the following circuit feeding the motor M: positive pole of the condenser C, armature 25, fixed contact 26, motor M, negative pole of the condenser C. This circuit remains closed during a moment due to the fact that the release of the relay R is delayed. When the armature 25 falls back, the motor M stops and the at least partially discharged condenser C is recharged by the photo-electric cell P. The described cycle can begin again.

The fifth example (FIG. 5) comprises again two relays $R_1$ and $R_2$ but these relays are connected in another way than in the first embodiment (FIG. 1). The photoelectric cell P is connected to the terminals of the condenser C. The winding 27 of the relay $R_1$ is in connection with the terminals of the condenser C through the intermediary of a resistance 28. The positive pole of the condenser C is also connected to the armature 29 of the relay $R_1$, while the fixed contact 30 of the relay $R_1$ is in connection with the winding 31 of the relay $R_2$ the other end of which goes to the negative pole of the condenser C. The armature 32 of the relay $R_2$ is connected to the positive pole of the condenser C, while the fixed contact 33 of the relay $R_2$ is in connection with a point lying between the winding 27 and the resistance 28. Finally, the motor M is inserted between the fixed contact 30 of the relay $R_1$ and the negative pole of the condenser C. Spiral springs 34 rent flowing through said second winding means said making contact and said electro-mechanical transducer upon closure of the making contact by said first winding means maintaining said making contact in closed condition during discharge of the charging-condenser means.

8. A device according to claim 1, comprising an electro-mechanical slow-release relay having winding means continuously connected to said charging-condenser means and a making contact interconnected between said charging-condenser means and said electro-mechanical transducer.

References Cited in the file of this patent

UNITED STATES PATENTS

| | | |
|---|---|---|
| 1,987,441 | Hardy | Jan. 8, 1935 |
| 2,096,916 | Pook | Oct. 26, 1937 |
| 2,423,320 | Hurley | July 1, 1947 |
| 2,769,120 | Nagel | Oct. 30, 1956 | and 35 guarantee the return of the respective armatures 29 and 32.

The fifth embodiment as shown in FIG. 5 works as follows:

When the cell P is illuminated the current produced charges the condenser C gradually and the circuit 27, 28 receives current so that the armature 29 is slowly displaced in the clockwise direction of FIG. 5. The resistances are calculated in such a way that the armature 29 touches the fixed contact 30 at the moment when the condenser C is completely charged. As soon as the contact pair 29, 30 is closed, a strong current begins to flow through the following circuit: positive pole of the condenser C, armature 29, fixed contact 30, winding 31 of the relay $R_2$, negative pole of the condenser C. In consequence, the armature 32 of the relay $R_2$ is suddenly displaced in the clockwise direction of FIG. 5 and strikes against the fixed contact 33. Thereby, the following circuit is established: positive pole of the condenser C, armature 32 of the relay $R_2$, fixed contact 33, winding 27 of the relay $R_1$, negative pole of the condenser C, this circuit holding the armature 29 adhered to the fixed contact 30. As may be seen, the resistance 28 is short-circuited in this circuit so that the current is greater than that traversing the winding 27 when the condenser C is not yet completely charged. As soon as the two armatures 29 and 32 are applied against their respective fixed contacts 30 and 33, the circuit of the motor M is established as follows: positive pole of the condenser C, armature 29, fixed contact 30, motor M, negative pole of the condenser C. This circuit comprises no other resistance than that of the motor M and the latter starts and rotates as long as is permitted by the condenser C. When the condenser C is discharged, the motor M stops, and another cycle can begin. The motor M is thus driven intermittently if the quantity of light falling onto the cell P is relatively small. However, the motor M can continuously rotate if the light illuminating the cell P is of sufficient intensity to maintain the condenser C charged to the maximum.

It is an advantage of the embodiment shown in FIG. 5 that, as long as the condenser C is not completely charged, only the circuit 27, 28 is under current. Therefore, the winding 31 of the relay $R_2$ does not receive current and the armature 32 remains immovable until the contact pair 29, 30 is closed. In consequence, the two relays $R_1$ and $R_2$ need not be adjusted in a particular manner as is necessary in the embodiments according to FIGS. 1 and 2 requiring a delicate adjusting. The relays $R_1$ and $R_2$ are simple commercial relays and their mounting does not require special precautions. The device as described with reference to FIG. 5 constitutes a preferred embodiment of the object of invention. Its operating manner is safe even if the device were exposed to sudden changes in position or to shocks.

In all the embodiments shown and described and in other performances of the invention several photoelectric cells may be used instead of only one cell.

Instead of being constituted by one or several relays the automatic regulator, serving for connecting the condenser to the motor on the condenser being charged, might be purely electronic or comprise one or several transistors.

While five embodiments of the invention have been shown and described it is not wished to restrict the scope of protection to these embodiments but reserved the right to make such modifications and rearrangements of the several parts that come within the purview of the appending claims.

I claim:

1. A device for converting light energy into mechanical energy, comprising at least one photo-electric cell adapted to be exposed to said light energy, charging-condenser means connected to said photo-electric cell, said charging-condenser means being charged by said photo-electric cell when the latter is exposed to said light energy, an electro-mechanical transducer, and relay means connected to said charging-condenser means, said relay means being operable when the charge of said charging-condenser means has reached a predetermined level for interconnecting said charging-condenser means and said electro-mechanical transducer for discharging said charge through said electro-mechanical transducer.

2. A device for converting light energy into mechanical energy, comprising at least one photo-electric cell adapted to be exposed to said light energy, charging-condenser means connected to said photo-electric cell, said charging-condenser means being charged by said photo-electric cell when the latter is exposed to said light energy, an electro-mechanical transducer, and relay means connected to said charging-condenser means, said relay means being operable when the charge of said charging-condenser means has reached a predetermined level for interconnecting said charging-condenser means and said electro-mechanical transducer for discharging said charge through said electro-mechanical transducer, and means for maintaining said relay means in a condition for interconnecting said charging-condenser means and said electro-mechanical transducer during discharge of the charging-condenser means.

3. A device according to claim 1, comprising electro-mechanical relay means comprising making contact means and winding means connected to said charging-condenser means, resistor means series-connected with said winding means, said making contact means bridging said resistor means and said making contact means being connected between said charging-condenser means and said electro-mechanical transducer, an open condition of said relay means wherein said making contact means are open and a closed condition of said relay means wherein said making contact means are closed, said electro-mechanical transducer being disconnected from said charging-condenser means and said winding means being connected to said charging-condenser means through said resistor means when said relay means are in their said open condition, and said electro-mechanical transducer being connected to said charging-condenser means and the said resistor means being bridged by said making contact means when said relay means are in their said closed condition.

4. A device according to claim 3, comprising two relays having each a making contact, the making contact of the one of such relays bridging said resistor means and the making contact of the other of such relays being connected between said charging-condenser means and said electro-mechanical transducer.

5. A device according to claim 3, comprising two relays having each a making contact, the one relay having its winding means connected to said resistor means and its making contact interconnected between said charging-condenser means and the winding means of the other relay and the said electro-mechanical transducer respectively, the making contact of said other relay bridging said resistor means.

6. A device according to claim 3, comprising a relay having a pair of making contacts adjusted for subsequent closure when the relay is operated, the making contact closing first bridging said resistor means and the making contact closing last being interconnected between said charging-condenser means and said electro-mechanical transducer.

7. A device according to claim 1, comprising an electro-mechanical relay having first winding means continuously connected to said charging-condenser means, a making contact and second winding means, said second winding means and said making contact being series-connected between said charging-condenser means and said electro-mechanical transducer, the discharging cur-